United States Patent
Khouri et al.

(10) Patent No.: US 7,176,748 B2
(45) Date of Patent: Feb. 13, 2007

(54) CHARGE PUMP CIRCUIT WITH A BRIEF SETTLING TIME AND HIGH OUTPUT VOLTAGE REGULATION PRECISION

(75) Inventors: Osama Khouri, Milan (IT); Giancarlo Ragone, Reggio Calabria (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 10 days.

(21) Appl. No.: 10/982,528

(22) Filed: Nov. 5, 2004

(65) Prior Publication Data

US 2005/0127982 A1    Jun. 16, 2005

(30) Foreign Application Priority Data

Nov. 5, 2003    (IT) .................. RM2003A000512

(51) Int. Cl.
*G05F 1/10* (2006.01)
(52) U.S. Cl. .................................................. 327/536
(58) Field of Classification Search ................ 327/534, 327/535, 537, 536; 363/60
See application file for complete search history.

(56) References Cited

U.S. PATENT DOCUMENTS

| | | | | |
|---|---|---|---|---|
| 5,153,855 A | * | 10/1992 | Konishi | 365/229 |
| 5,159,543 A | * | 10/1992 | Yamawaki | 363/60 |
| 5,426,334 A | * | 6/1995 | Skovmand | 327/427 |
| 5,561,385 A | * | 10/1996 | Choi | 327/536 |
| 6,249,445 B1 | * | 6/2001 | Sugasawa | 363/60 |
| 6,297,687 B1 | * | 10/2001 | Sugimura | 327/536 |
| 6,597,235 B2 | * | 7/2003 | Choi | 327/536 |
| 6,717,458 B1 | * | 4/2004 | Potanin | 327/536 |
| 6,765,428 B2 | * | 7/2004 | Kim et al. | 327/534 |
| 6,798,274 B2 | * | 9/2004 | Tanimoto | 327/536 |
| 2003/0210089 A1 | * | 11/2003 | Tanzawa et al. | 327/536 |
| 2004/0066225 A1 | * | 4/2004 | Seo | 327/536 |

* cited by examiner

*Primary Examiner*—Jeffrey Zweizig
(74) *Attorney, Agent, or Firm*—Lisa K. Jorgenson; Allen, Dyer, Doppelt, Milbrath & Gilchrist, P.A.

(57) ABSTRACT

A circuit for converting a direct current input voltage into an output voltage greater than the input voltage. The circuit includes a charge pump and a block for generating pulse signals of a predetermined frequency to be applied to a control input of the charge pump. The settling time, i.e. the time necessary for the output voltage to attain its operating value and to maintain it with a given precision, is reduced by providing the circuit with charge injection control via modulation of the duty cycle of the pulse signals as a function of the difference between the output voltage, or a predetermined fraction thereof, and a predetermined reference voltage and in such a manner as to reduce the settling time as the difference diminishes. The circuit includes a regulator that controls the charge pump based upon the predetermined reference voltage.

28 Claims, 4 Drawing Sheets

CHARGE PUMP CIRCUIT WITH A BRIEF SETTLING TIME AND HIGH OUTPUT VOLTAGE REGULATION PRECISION

FIELD OF THE INVENTION

The present invention relates to a circuit for converting a direct current input voltage into a boosted output voltage, i.e. greater than the input voltage, with a charge pump and generation of pulse signals of predetermined frequency for controlling the charge pump circuit.

BACKGROUND OF THE INVENTION

Use of devices including non-volatile memories is becoming ever more widespread in a variety of electronic devices. In particular, the extensive use that is being made of mass consumer electronic equipment such as cellular telephones, portable audio reproducers and digital photographic and television cameras has led to a need for satisfying a growing demand for electronic devices having low power consumption and high memory capacity. These needs have led to a gradual reduction of the size of the transistors of the integrated circuits, a consequent reduction of the supply voltages and a growth of the complexity of the circuits. In fact, the need for assuring control and correct management of the internal signals, especially the analog ones, even when the supply voltages are low, calls for supplementary circuit functions and particular measures in the design of the integrated circuit.

An often fundamental requirement of electronic devices of the aforementioned type is a brief time for accessing the non-volatile memory. The proper operation of non-volatile memories in general, and "flash" memories in particular, calls for relatively intense electric fields that cannot be obtained directly from the supply voltage of the device. In these cases use is made of voltage booster circuits. A typical voltage booster circuit comprises a charge pump, usually integrated into the device containing the memory, that assures the generation of the necessary high voltages starting from the supply voltage. Starting from a given supply voltage, it is possible to realize booster circuits capable of providing positive boosted voltages and booster circuits capable of providing negative boosted voltages to satisfy all the biasing needs of the non-volatile memories. Hereinafter the term converter will also be used to identify a voltage booster circuit.

If the shortest possible memory access time is to be obtained, the time the converter needs to generate the operating voltages has to be as brief as possible: this is equivalent to maximizing both the start-up speed, i.e. the speed at which the output voltage of the converter is brought from zero to the operating value, and the recovery speed, i.e. the speed with which the output voltage is brought back to its operating value after it has undergone a lowering (in absolute value) on account of an overload. In other words, it is important to minimize the settling time, i.e. the time necessary for the output voltage of the converter to attain its operating value and to maintain it with a given precision.

Other important characteristics of a charge pump converter are the precision and stability of the output voltage. Precision may be obtained via a regulation circuit that enables or disables the charge pump in such a manner as to maintain the output voltage at a predetermined value. There may nevertheless occur the situation in which the charge pump has to work in a variable current regime, i.e. with absorption of current by the variable load in the course of time, so that the output voltage will not be as stable as would be desirable, but subject to a ripple. If the converter and the memory are to function correctly, it is therefore desirable to dispose of a fast regulation system to make sure that the regulated output value will be obtained in a short time and yet have the desired precision.

The following discussion refers to a cell of a non-volatile memory of the "flash" type. The programming (or writing) of the cell is obtained by applying very precise voltage values in several equal and successive phases to its terminals (gate, source, drain and body). In the case of a flash cell formed by "triple well" technology, for example, the cell is biased at the beginning of each of these phases by bringing the drain electrode to a predetermined positive voltage (typically +4V), the source electrode to ground potential (0V), and the body electrode to a predetermined negative voltage (typically −1.5V); the gate electrode is initially brought to a positive voltage (typically +2.5V) that in each subsequent phase is increased by a predetermined voltage step (300 mV, for example). In the second part of each individual phase the state of the cell is examined via a verification operation: whenever the threshold voltage of the cell is not comprised in a range of predetermined values, the operation described above is repeated, thus increasing the gate voltage by another step, otherwise the programming is terminated.

The above discussion makes it clear that, given the numerous cell biasing operations that always call for non negligible settling times, the programming of a flash memory occupies a relatively long time. In the case of a memory of the multilevel type, i.e. a memory in which the cells can be programmed at several threshold levels and are therefore capable of storing more than one bit per cell, this problem is particularly strongly felt, because the number of programming phases is greater and the sum of the settling times is therefore likewise greater. In certain cases the programming time may arrive at relatively very high values, for example, as much as several hundred microseconds.

Naturally, the problem related to the settling time concerns not only the programming of the cells, but also all the other operations in which the cell electrodes and the parasitic capacitances associated with them have to be biased with voltages generated by charge pumps.

SUMMARY OF THE INVENTION

An object of the present invention is to provide a voltage booster circuit of the charge pump type capable of producing voltages with brief settling times.

Another object is to provide a voltage booster circuit of the charge pump type in which the output voltage can be regulated with great speed and precision.

These and other objects are attained by a circuit for converting a direct current input voltage into an output voltage greater than the input voltage. The circuit includes a charge pump and a block for generating pulse signals of a predetermined frequency to be applied to a control input of the charge pump. The settling time, i.e. the time necessary for the output voltage to attain its operating value and to maintain it with a given precision, is reduced by providing the circuit with charge injection control via modulation of the duty cycle of the pulse signals as a function of the difference between the output voltage, or a predetermined fraction thereof, and a predetermined reference voltage and in such a manner as to reduce the settling time as the difference diminishes. The circuit includes a regulator that controls the charge pump based upon the predetermined reference voltage.

BRIEF DESCRIPTION OF THE DRAWINGS

The invention will be more readily understood from the following detailed description of some embodiments thereof, the description making reference to the attached drawings, of which.

DETAILED DESCRIPTION OF THE PREFERRED EMBODIMENTS

Figure 1:
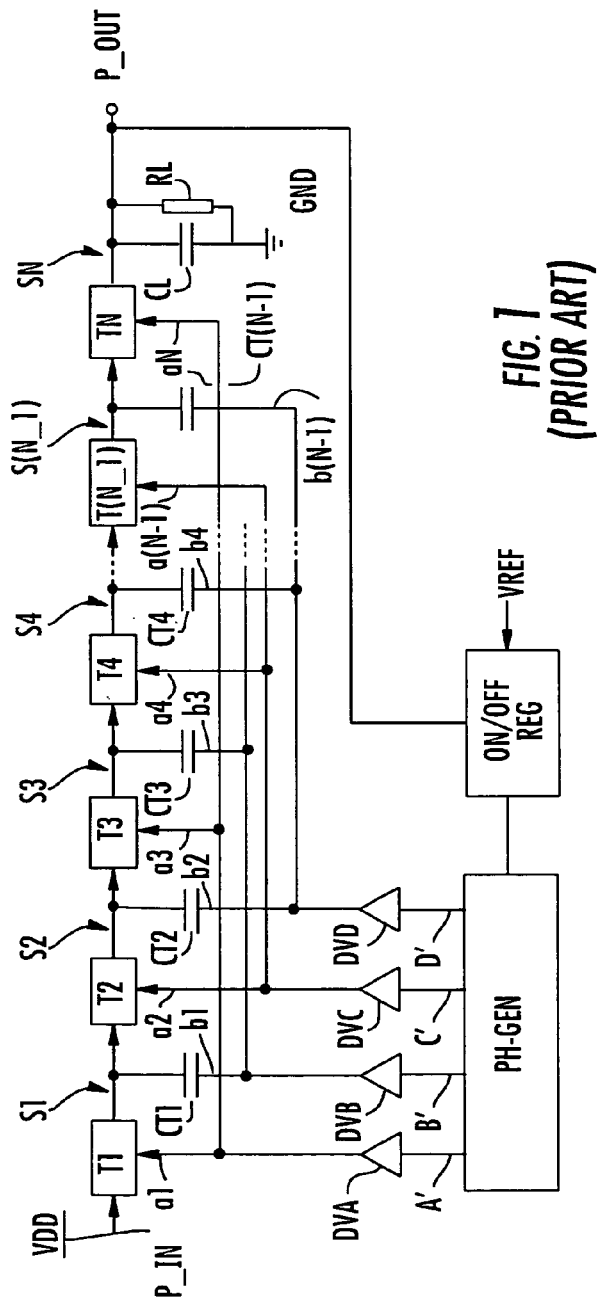
FIG. 1 is a schematic diagram showing the functional layout of a known charge pump converter.

A charge pump converter typically utilized for generating some of the positive voltages necessary for the operation of a non-volatile memory is shown in FIG. 1. The charge pump circuit includes a multiplicity of stages S1–SN connected in cascade between an input terminal P-IN and an output terminal P-OUT. The input terminal is connected to a supply voltage source VDD and the output terminal is connected to a load represented by a capacitor CL and a resistance RL in parallel with each other. Each stage comprises a load transfer element T1–TN with an activation terminal a1–aN and, as charge storage element, a capacitor CT1–CT(N–1) connected between the output of the respective transfer element and a control terminal b1–b(N–1). An exception is in the last stage SN, the output of which is the output (P-OUT) of the converter and is connected to the load.

Figure 2:
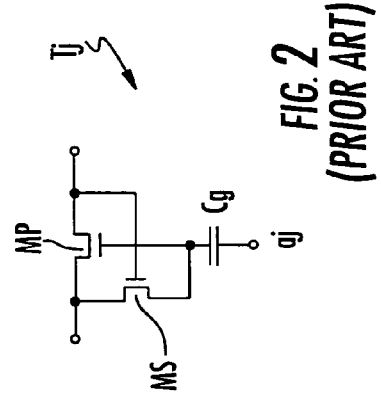
FIG. 2 is a schematic diagram showing the circuit layout of a stage of the charge pump of the converter of FIG. 1.

By way of example and as shown in FIG. 2, each of the charge transfer elements T1–TN may be formed by an N-channel MOS transistor, indicated by MP, that has its gate electrode connected to a respective activation terminal aj via a coupling capacitor Cg. Also provided is a second MOS transistor, indicated by MS, that acts as the charging element of the coupling capacitor Cg.

The converter comprises a timing signal generator PH-GEN that generates four rectangular waveforms A', B', C', D' that are appropriately out of phase with respect to each other. The four outputs of the generator PH-GEN are connected to the activation terminals a1–aN and the control terminals b1–b(N–1) via respective buffers DVA-DVD to pilot the charge transfer elements and the associated capacitors in a manner known to persons skilled in the art and such as to obtain at the output P-OUT a voltage that is substantially greater than the input voltage VDD.

A feedback regulation is provided to maintain the output voltage at a predetermined stable value. In particular, the output P-OUT is connected to a logic device, indicated by ON/OFF REG, in which a predetermined fraction of the output voltage of the pump is compared with a predetermined reference voltage VREF. The logic device ON/OFF REG is connected to an input of the phase generator PH-GEN in such a manner as to enable or disable the outputs when the predetermined fraction of the voltage generated at the output of the charge pump is, respectively, smaller or greater than the reference voltage VREF. The effect of this regulation is to stabilize the pump output at the desired boosted voltage.

When designing a charge pump converter, important characteristics include the value of the output voltage that has to be generated, the maximum current that has to be provided and the maximum permissible ripple of the output voltage under the expected load conditions. These specifications determine the number of stages that have to be provided, the dimensioning of these stages and the clock switching frequency needed for optimizing the conversion efficiency.

Figure 3:
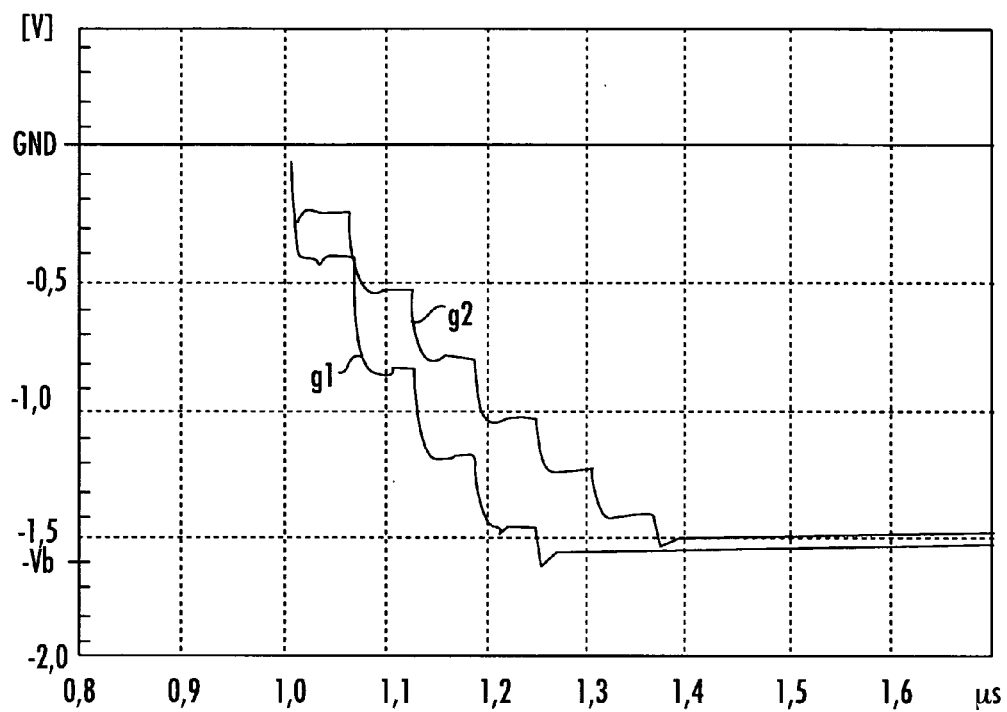
FIG. 3 is a graph that illustrate the settling times of a biasing voltage generated by two known converters with charge pumps that utilize capacitors of different capacitances.

It is known that the settling time of the voltages generated by a charge pump circuit of the type described above is to a large extent determined by the capacitance of the capacitors associated with the charge transfer elements. More particularly, a typical approach intended to obtain shorter settling times is to increase the capacitance of the capacitors. By way of example, FIG. 3 shows two plot lines relating to two negative-output charge pump circuits that differ from each other on account of the capacitance of the capacitors. The two plot lines, indicated by g1 and g2, show the output voltage transitions of the two circuits from a reference value GND (0V) to a negative bias value –Vb (–1.6V). More particularly, the graph indicated by g1 refers to a circuit with capacitors that are oversized as compared with the capacitors of the other circuit, the one to which graph g2 refers. It can be seen that the settling time of the pump with the larger capacitance (twice the capacitance in this particular example) is about 120 ns shorter than that of the other pump (360 ns). It is to be understood that wholly similar behavior patterns are obtained by oversizing the capacitors of a positive-output voltage booster circuit, as is the circuit shown in FIG. 1.

Figure 4:
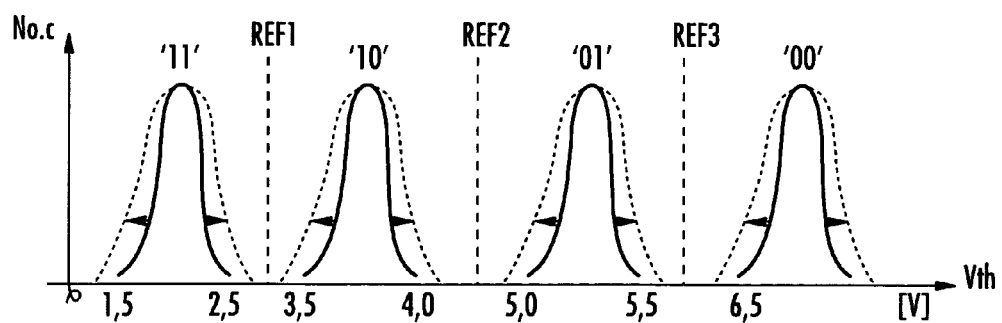
FIG. 4 is a diagram showing the distributions of the threshold voltages of non-volatile multilevel memory cells; the solid lines refer to the ideal distributions, while the broken lines refer to the real distributions and take account of parasitic and interference effects.

However, this approach has its limits, because the precision of the voltage regulation point will diminish as the capacitance of the capacitors is stepped up, particularly when the regulation is of the ON/OFF type like the one described in the above example. It therefore follows that the programming of the cells will lead to a widening of the threshold voltage distributions as indicated by the broken lines in FIG. 4, and in multilevel memory cells this translates into a reduction of the margin for a correct reading of the cells. This effect is illustrated by FIG. 4, where the ordinate indicates the number of cells No.c and the abscissa indicates the voltages; REF1, REF2 and REF3 are the reference voltages.

Figure 5:
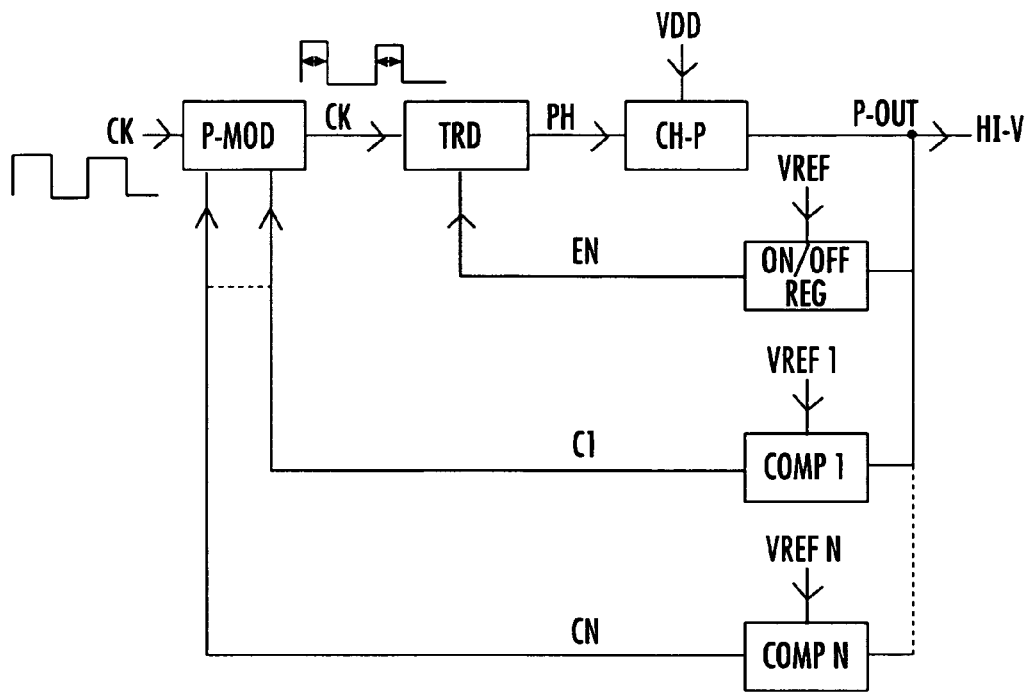
FIGS. 5 to 8 are schematic diagrams showing the functional layouts of various embodiments of the invention.

The following description refers to the functional block diagram of FIG. 5, which shows a particular embodiment of the invention. A charge pump CH-P has an input to which there is applied a voltage VDD (3V, for example), which could be the supply voltage of the integrated circuit of which the converter forms part, and an output P-OUT on which there forms the voltage HI-V generated by the converter. A controlled transducer circuit TRD provides the pump CH-P with timing signals PH for the various pump stages. A regulation circuit ON/OFF-REG compares a predetermined fraction of the output voltage HI-V of the converter with a reference voltage VREF having a predetermined value that is closely correlated with the voltage it is desired to obtain at the output and, via a signal EN, enables or disables the transducer circuit TRD in such a manner as to maintain the output voltage at the desired value. The timing signals PH are produced from the modified clock signals CK' that are provided to the transducer circuit TRD by a pulse width modulator P-MOD. As input, the pulse width modulator P-MOD receives a clock signal CK arriving from the principal clock generator of the integrated circuit. Each comparator of a multiplicity of comparators, indicated by COMP1–COMPN, compares a predetermined fraction of the output voltage HI-V a the respective intermediate reference voltage VREF1–VREFN and generates an output signal C1–CN that is applied to a corresponding input of the modulator P-MOD.

The intermediate reference voltages VREF1–VREFN are chosen as increasing values that are smaller than VREF. The signals C1–CN may be voltages of a low or a high logic level, according to whether the compared voltages, respectively, do or do not exceed the respective reference voltages in absolute value. The modulator P-MOD generates a modified clock signal CK', i.e. a pulse signal (e.g. a square wave) having a predetermined frequency, for example, the same frequency as the principal clock signal CK, and a variable duty cycle. For example, the duty cycle maintains a predetermined initial value (50%, for example) until a signal C1–CN arrives at the input. When this is the case, the duty cycle is modified. More particularly, the width of the clock pulse is reduced when the signal C1 arrives, is reduced again when the signal C2 arrives and thereafter is further reduced every time there arrives one of the subsequent signals up to CN. In other words, the width of the clock pulse becomes more and more reduced as the voltage HI-V or a predetermined fraction thereof approaches the reference value VREF. In this way the charge quantity injected into the capacitors of the charge pump becomes gradually smaller as the voltage HI-V approaches the desired output voltage. Accurate regulation of the output voltage HI-V is obtained without having to forego the advantage of the shorter settling times due to the use of capacitors of greater capacitance.

Figure 6:
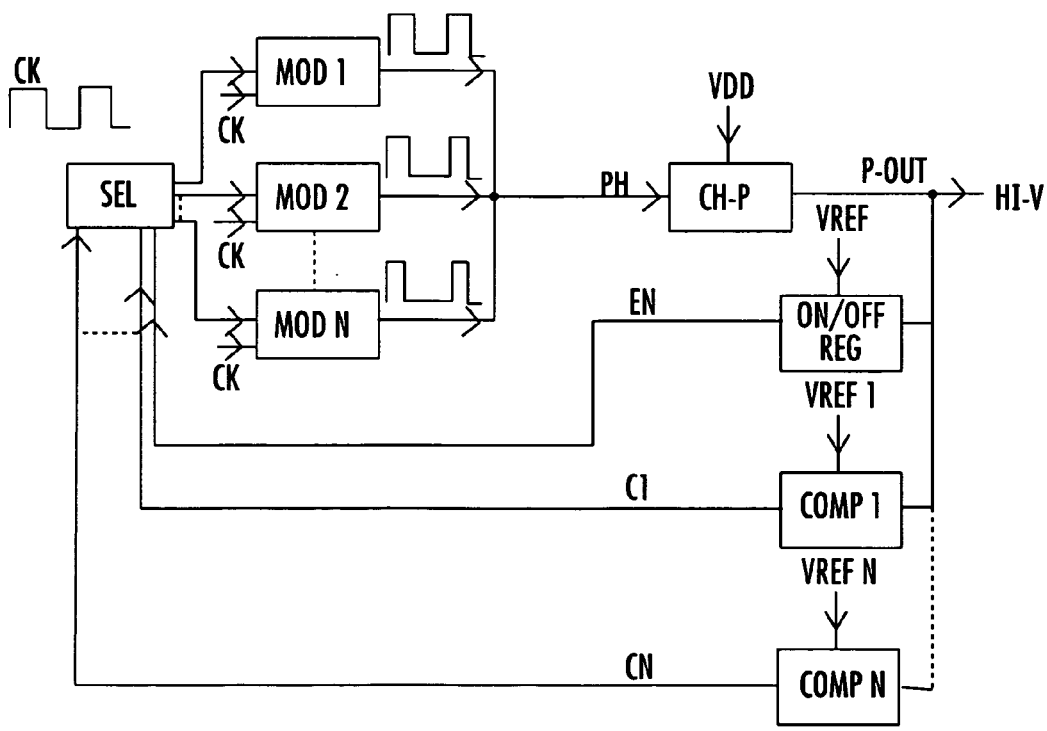

The embodiment shown in FIG. 6 differs from the one of FIG. 5. In place of pulse width modulator P-MOD and the transducer circuit TRD, this embodiment is provided with a selection logic unit SEL and a group of modulators MOD1–MODN. The various modulators are made in such a way as to modify the duty cycle of each incoming clock signal CK in a different predetermined manner. More generally, each modulator may be made in such a way as to produce a different predetermined waveform at the output. In the example shown, the modulators MOD1–MODN generate clock pulses having a gradually decreasing duty cycle (from 35% to 10%, for example). Both the enablement signal EN and the output signals C1–CN of the comparators COMP1–COMPN are applied to the selection logic unit SEL. This unit has its two outputs connected to the modulators and selects one or the other output according to the state of the incoming signals C1–CN. The modulator selection criterion is similar to the one already described in connection with FIG. 5, i.e. the chosen modulator has a duty cycle that becomes gradually smaller as the difference between the output voltage HI-V, or a predetermined fraction thereof, and the reference voltage VREF becomes smaller. The enablement signal EN has the effect of enabling or disabling the activation of all the outputs of the logic unit SEL and therefore performs the same regulation function as it had in the circuit of FIG. 5.

Figure 7:
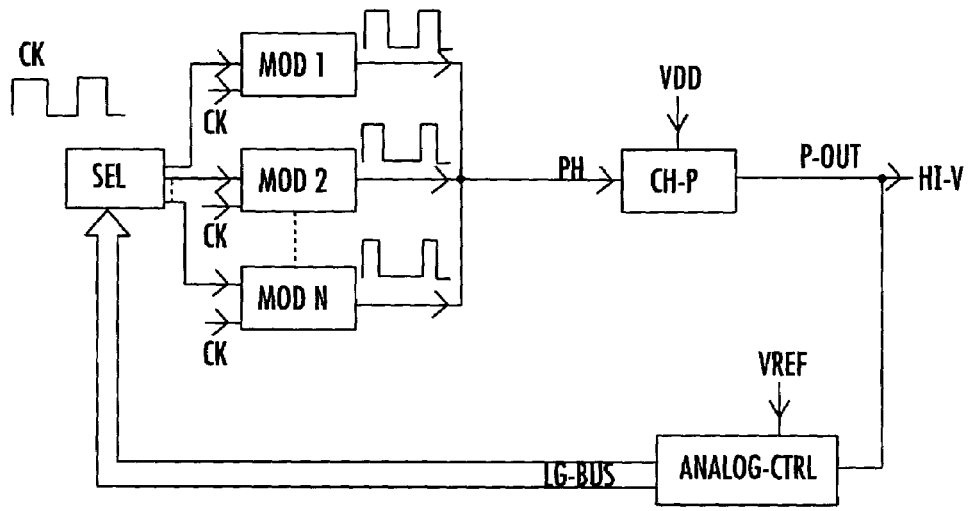

The embodiment of FIG. 7 differs from the one of FIG. 6. Here, in place of the regulator ON/OFF-REG and the comparators COMP1–COMPN, there is provided a single block ANALOG-CTRL that receives as input the voltage HI-V generated by the charge pump and the reference voltage VREF and generates different logic signals according to the outcome of the comparison between the output voltage HI-V, or a predetermined fraction thereof, and the reference voltage VREF. These logic signals, applied as input to the selection logic unit SEL via a bus LG-BUS, activate this unit in the same way as the signals C1–CN and EN of the example of FIG. 6.

Figure 8:
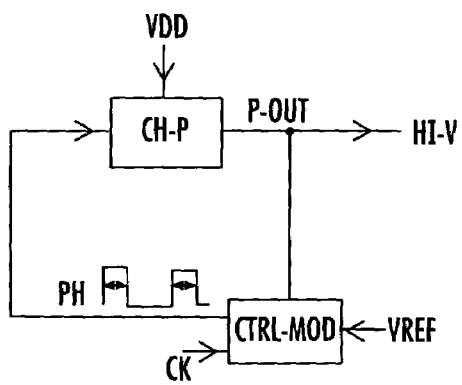

The embodiment of FIG. 8 shows a single block CTRL-MOD that receives as input the output voltage HI-V, the reference voltage VREF and the clock signal CK and performs the modulator and control functions. In other words, it performs both the comparison function and the function of modulating the functional units corresponding to the embodiments illustrated by FIGS. 5 to 7. As compared with these embodiments, however, it renders possible a continuous variation of the duty cycle.

Accordingly, as discussed above, the width modulation of the charge pump timing pulses makes it possible to reduce the settling times and improve the speed and the precision with which the output voltage of the converter is regulated. Consequently, use of the converter in accordance with the invention is particularly advantageous in devices having twin-level and multilevel non-volatile memories.

Although a few embodiments of the invention have here been illustrated and described, it is clear that numerous variants and modifications are possible within the scope of the invention.

That which claimed is:

1. A circuit for converting an input voltage into an output voltage greater than the input voltage comprising:
    a charge pump including a control input;
    a pulse signal generator for generating pulse signals of a frequency to be applied to the control input of the charge pump; and
    a regulator for regulating the duty cycle of the pulse signals based upon a difference between at least a part of the output voltage and a reference voltage so that the duty cycle is reduced as the difference decreases.

2. A circuit according to claim 1, wherein the duty cycle is regulated in a discrete manner.

3. A circuit according to claim 1, wherein the duty cycle is regulated in a continuous manner.

4. A circuit according to claim 1, wherein the regulator comprises:
    at least one comparator having a first input receiving the output voltage, a second input receiving a intermediate reference voltage less than the reference voltage, and an output; and
    a pulse width modulator having a first input receiving a clock signal, a control input connected to the output of the at least one comparator, and an output connected to the control input of the charge pump.

5. A circuit according to claim 1, wherein the regulator comprises:
    at least one comparator having a first input receiving the output voltage, a second input receiving a intermediate reference voltage less than the reference voltage, and an output; and
    a plurality of pulse width modulators, each of which has a first input receiving a clock signal, a second input, and an output connected to the control input of the charge pump, to modify the duty cycle of the clock signal in a manner different from the other pulse width modulators of the plurality of pulse width modulators; and
    a selection logic unit having an input connected to the output of the at least one comparator, and a plurality of selection outputs, each of which is connected to a second input of one of the plurality of pulse width modulators for selective activation of the modulators.

6. A circuit according to claim 1, wherein the regulator comprises:
a control logic unit having a first input receiving the output voltage, a second input receiving the reference voltage, and an output;
a plurality of pulse width modulators, each of which has a first input receiving a clock signet, a second input, and an output connected to the control input of the charge pump, to modify the duty cycle of the clock signal in a manner different from the other pulse width modulators of the plurality of pulse width modulators; and
a selection logic unit having an input connected to the output of the control logic unit, and a plurality of selection outputs, each of which is connected to a second input of one of the plurality of pulse width modulators for selective activation of the modulators.

7. A circuit according to claim 1, wherein the regulator comprises a control and pulse width modulating unit having a first modulation input receiving the output voltage, a second input receiving the reference voltage, a third input receiving a clock signal, and an output connected to the control input of the charge pump, the control and pulse width modulating unit also defining the pulse signal generator.

8. A circuit according to claim 1, further comprising a feedback regulator receiving the output voltage and for controlling the charge pump based upon the output voltage and the reference voltage.

9. A circuit according to claim 4, further comprising a feedback regulator receiving the output voltage and for controlling the charge pump based upon the output voltage and the reference voltage; wherein the pulse signal generator comprises a transducer circuit connected between the output of the pulse width modulator and the control input of the charge pump and having an enabling/disabling input connected to the feedback regulator.

10. A circuit according to claim 5, further comprising a feedback regulator receiving the output voltage and for controlling the charge pump based upon the output voltage and the reference voltage; wherein the pulse signal generator comprises an enabling/disabling unit that defines part of the selection logic unit and is connected to the feedback regulator.

11. A circuit according to claim 6, further comprising a feedback regulator receiving the output voltage and for controlling the charge pump based upon the output voltage and the reference voltage; wherein the pulse signal generator comprises an enabling/disabling unit that defines part of the selection logic unit and is connected to the feedback regulator.

12. A circuit according to claim 10 wherein the feedback regulator comprises a comparator having a first input receiving the output voltage, a second input receiving the reference voltage and an output connected to the selection logic unit.

13. A circuit according to claim 7, wherein the control and modulation logic unit further comprises a feedback regulator receiving the output voltage and for controlling the charge pump based upon the output voltage and the reference voltage.

14. A device comprising:
a multilevel non-volatile memory; and
a circuit, associated with the memory, for converting an input voltage into an output voltage greater than the input voltage comprising
a charge pump including a control input,
a pulse signal generator for generating pulse signals of a frequency to be applied to the control input of the charge pump, and
a regulator for regulating the duty cycle of the pulse signals based upon a difference between at least a part of the output voltage and a reference voltage so that the duty cycle is reduced as the difference decreases.

15. A device according to claim 14, wherein the duty cycle is regulated in a discrete manner.

16. A device according to claim 14, wherein the duty cycle is regulated in a continuous manner.

17. A method for converting an input voltage into an output voltage greater than the input voltage comprising:
providing a charge pump including a control input;
generating pulse signals of a frequency with a pulse signal generator to be applied to the control input of the charge pump; and
regulating the duty cycle of the pulse signals based upon a difference between at least a part of the output voltage and a reference voltage so that the duty cycle is reduced as the difference decreases.

18. A method according to claim 17, wherein the duty cycle is regulated in a discrete manner.

19. A method according to claim 17, wherein the duty cycle is regulated in a continuous manner.

20. A method according to claim 17, wherein regulating the duty cycle comprises providing a regulator including:
at least one comparator having a first input receiving the output voltage, a second input receiving a intermediate reference voltage less than the reference voltage, and an output; and
a pulse width modulator having a first input receiving a clock signal, a control input connected to the output of the at least one comparator, and an output connected to the control input of the charge pump.

21. A method according to claim 17, wherein regulating the duty cycle comprises providing a regulator including:
at least one comparator having a first input receiving the output voltage, a second input receiving a intermediate reference voltage less than the reference voltage, and an output; and
a plurality of pulse width modulators, each of which has a first input receiving a clock signal, a second input, and an output connected to the control input of the charge pump, to modify the duty cycle of the clock signal in a manner different from the other pulse width modulators of the plurality of pulse width modulators; and
a selection logic unit having an input connected to the output of the at least one comparator, and a plurality of selection outputs, each of which is connected to a second input of one of the plurality of pulse width modulators for selective activation of the modulators.

22. A method according to claim 17, wherein regulating the duty cycle comprises providing a regulator including:
a control logic unit having a first input receiving the output voltage, a second input receiving the reference voltage, and an output;
a plurality of pulse width modulators, each of which has a first input receiving a clock signal, a second input, and an output connected to the control input of the charge pump, to modify the duty cycle of the clock signal in a manner different from the other pulse width modulators of the plurality of pulse width modulators; and
a selection logic unit having art input connected to the output of the control logic unit, and a plurality of selection outputs, each of which is connected to a second input of one of the plurality of pulse width modulators for selective activation of the modulators.

23. A method according to claim 17, wherein regulating the duty cycle comprises providing a regulator including a control and pulse width modulating unit having a first modulation input receiving the output voltage, a second input receiving the reference voltage, a third input receiving a clock signal, and an output connected to the control input of the charge pump, the control and pulse width modulating unit also defining the pulse signal generator.

24. A method according to claim 17, further comprising controlling the charge pump based upon the output voltage and the reference voltage with a feedback regulator receiving the output voltage.

25. A method according to claim 20, further comprising controlling the charge pump based upon the output voltage and the reference voltage with a feedback regulator receiving the output voltage; wherein the pulse signal generator comprises a transducer circuit connected between the output of the pulse width modulator and the control input of the charge pump and having an enabling/disabling input connected to the feedback regulator.

26. A method according to claim 21, further comprising controlling the charge pump based upon the output voltage and the reference voltage with a feedback regulator receiving the output voltage; wherein the pulse signal generator comprises an enabling/disabling unit that defines part of the selection logic unit and is connected to the feedback regulator.

27. A method according to claim 22, further comprising controlling the charge pump based upon the output voltage and the reference voltage with a feedback regulator receiving the output voltage; wherein the pulse signal generator comprises an enabling/disabling unit that defines part of the selection logic unit and is connected to the feedback regulator.

28. A method according to claim 27 wherein the feedback regulator comprises a comparator having a first input receiving the output voltage, a second input receiving the reference voltage and an output connected to the selection logic unit.

* * * * *

UNITED STATES PATENT AND TRADEMARK OFFICE
CERTIFICATE OF CORRECTION

PATENT NO.        : 7,176,748 B2                                          Page 1 of 1
APPLICATION NO. : 10/982528
DATED             : February 13, 2007
INVENTOR(S)       : Osama Khouri and Giancarlo Ragone It is certified that error appears in the above-identified patent and that said Letters Patent is hereby corrected as shown below:

Column 5, Line 8       Delete: "voltage HI-V a the"
                       Insert: --voltage HI-V to the--

Column 7, Line 10      Delete: "a clock signet,"
                       Insert: --a clock signal,--

Column 8, Line 65      Delete: "unit having art"
                       Insert: --unit having an--

Signed and Sealed this

Seventh Day of August, 2007

JON W. DUDAS
*Director of the United States Patent and Trademark Office*